United States Patent
Hoshino et al.

(10) Patent No.: US 8,311,716 B2
(45) Date of Patent: Nov. 13, 2012

(54) CONTROL APPARATUS FOR SHIFT RANGE CHANGEOVER DEVICE

(75) Inventors: Keiji Hoshino, Kariya (JP); Shigeru Kamio, Nagoya (JP)

(73) Assignee: Denso Corporation, Kariya (JP)

( * ) Notice: Subject to any disclaimer, the term of this patent is extended or adjusted under 35 U.S.C. 154(b) by 389 days.

(21) Appl. No.: 12/467,494

(22) Filed: May 18, 2009

(65) Prior Publication Data

US 2009/0292431 A1  Nov. 26, 2009

(30) Foreign Application Priority Data

May 21, 2008  (JP) .................................. 2008-133693

(51) Int. Cl.
- *G06F 7/00* (2006.01)
- *G06F 17/00* (2006.01)
- *G06F 19/00* (2011.01)

(52) U.S. Cl. ........................... 701/62; 477/111; 477/254

(58) Field of Classification Search .................... 701/62; 477/111, 115; 318/446; 475/254
See application file for complete search history.

(56) References Cited

U.S. PATENT DOCUMENTS

| | | | | |
|---|---|---|---|---|
| 4,911,031 A * | 3/1990 | Yoshimura et al. | ............. | 74/335 |
| 5,094,115 A * | 3/1992 | Michihira et al. | ............. | 74/335 |
| 5,601,510 A * | 2/1997 | Sakakiyama et al. | ........... | 477/96 |
| 5,611,304 A * | 3/1997 | Shinojima | ................ | 123/90.15 |
| 6,390,044 B2 * | 5/2002 | Yoshizawa et al. | ........ | 123/90.17 |
| 6,564,133 B2 * | 5/2003 | Ebashi | ............................ | 701/62 |
| 6,615,778 B2 * | 9/2003 | Iwaki et al. | ................ | 123/90.17 |
| 6,866,611 B2 * | 3/2005 | Tsuzuki et al. | ................ | 477/97 |
| 7,987,959 B2 * | 8/2011 | Itazu et al. | ................. | 192/219.5 |
| 2001/0013324 A1 * | 8/2001 | Yoshizawa et al. | ........ | 123/90.16 |
| 2002/0019287 A1 * | 2/2002 | Ebashi et al. | ................. | 475/254 |
| 2002/0020236 A1 * | 2/2002 | Onodera | ......................... | 74/335 |
| 2004/0008002 A1 * | 1/2004 | Kamio et al. | ................. | 318/701 |
| 2004/0053743 A1 * | 3/2004 | Tsuzuki et al. | ................. | 477/97 |
| 2004/0200683 A1 | 10/2004 | Amamiya et al. | | |
| 2005/0151492 A1 * | 7/2005 | Nakai et al. | .................... | 318/432 |
| 2005/0174084 A1 * | 8/2005 | Nakai et al. | .................... | 318/632 |
| 2006/0006827 A1 * | 1/2006 | Nakai et al. | .................... | 318/701 |
| 2006/0033464 A1 * | 2/2006 | Nakai et al. | .................... | 318/701 |

(Continued)

FOREIGN PATENT DOCUMENTS

JP  07-305770  11/1995

OTHER PUBLICATIONS

Office Action (2 pgs.) dated Sep. 15, 2011 issued in corresponding Japanese Application No. 2008-133693 with an at least partial English-language translation thereof (1 pg.).

*Primary Examiner* — Khoi Tran
*Assistant Examiner* — Jamie Figueroa
(74) *Attorney, Agent, or Firm* — Nixon & Vanderhye P.C.

(57) ABSTRACT

A control apparatus for a shift range changeover device determines temporary abnormality, when a detection output of a rotation position of a motor continues to be abnormal for a first abnormality determination period. The control apparatus further determines persistent abnormality and performs predetermined failsafe processing, when the detection output further continues to be abnormal for a second abnormality period following the first abnormality period. If the temporary abnormality is determined within a feedback control permission period, motor feedback control is prohibited to control the shift range to the neutral range. If the temporary abnormality is determined after the feedback control permission period, the same control operation as before the temporary abnormality is performed.

4 Claims, 7 Drawing Sheets

U.S. PATENT DOCUMENTS

| | | | |
|---|---|---|---|
| 2006/0103339 A1* | 5/2006 | Yamada et al. | 318/623 |
| 2006/0207373 A1* | 9/2006 | Amamiya et al. | 74/473.36 |
| 2007/0182353 A1* | 8/2007 | Kamio et al. | 318/466 |
| 2008/0024081 A1* | 1/2008 | Isobe et al. | 318/446 |
| 2008/0040009 A1* | 2/2008 | Kamada et al. | 701/51 |
| 2008/0129236 A1* | 6/2008 | Isobe et al. | 318/468 |
| 2008/0182717 A1* | 7/2008 | Shinojima et al. | 477/115 |
| 2009/0038430 A1* | 2/2009 | Itazu et al. | 74/503 |

* cited by examiner

CONTROL APPARATUS FOR SHIFT RANGE CHANGEOVER DEVICE

CROSS REFERENCE TO RELATED APPLICATION

This application is based on and incorporates herein by reference Japanese Patent Application No. 2008-133693 filed on May 21, 2008.

FIELD OF THE INVENTION

The present invention relates to a control apparatus for a shift range changeover device, which changes over a shift range of an automatic transmission of a vehicle by using an electric motor as a motive power source.

A shift-by-wire type shift range changeover system is proposed for an automatic transmission of a vehicle in, for example, US 2004/0200683 A1 (JP 2004-308847 A). In this system, a shift range changeover operation (shift lever manipulation) in an automatic transmission of a vehicle driver is detected by switches, and an electric motor is driven in accordance with the detection signals of the switches thereby to change over the shift range of the automatic transmission to a target shift range selected by the vehicle driver.

In this system, even when the motor is not rotating, the rotation position of the motor (specifically, motor rotor or shaft) is detected in accordance with a count value of an encoder thereby to feedback-control the motor. With this feedback control, the motor is controlled so that the actual rotation position of the motor indicated by the count value attains a predetermined target rotation position.

It is likely that, if the encoder produces abnormal pulses such as noises although no shift range changeover operation is made by the vehicle driver, the detected rotation position of the motor deviates from the target rotation position. The motor is feedback-controlled so that the deviation is reduced. As a result, the actual shift range may be erroneously changed over to a shift range different from that selected by the vehicle driver.

SUMMARY OF THE INVENTION

It is therefore an object of the present invention to provide a control apparatus for a shift range changeover device of an automatic transmission, which prevents a shift range from being changed over to a shift range different from a target shift range selected by a vehicle driver due to abnormality in detection of rotation position.

According to one aspect of the present invention, a control apparatus for a shift range changeover device is provided. The control apparatus includes a motor as a drive source and changes over a shift range of an automatic transmission. The control apparatus detects a rotation position of the motor or a rotation member rotated by the motor, performs feedback control for the motor for changing over the shift range from an actual shift range to a target shift range in accordance with a detection output indicating the detected rotation position, and prohibits the feedback control for the motor after a predetermined feedback control permission period measured from changeover of the target shift range. The feedback control permission period is set to be greater than a motor drive period required for the shift range changeover device to change over the shift range from the actual shift range to the target shift range. It is noted that, when the feedback is prohibited, the motor holds its rotation position.

Preferably, the control apparatus determines temporary abnormality, when the detection output continues to be abnormal for a first abnormality determination period. The control apparatus determines persistent abnormality and perform predetermined failsafe processing, when the detection output continues to be abnormal for a second abnormality determination period following determination of the temporary abnormality. The control apparatus prohibits the feedback control for the motor and control the shift range changeover device to effect a neutral range, when the temporary abnormality is determined within the feedback control permission period. The control apparatus continues same control as performed before the temporary abnormality is determined, when the temporary abnormality is determined in a period in which the feedback control for the motor is prohibited.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE EMBODIMENT

Embodiment

Figure 1:
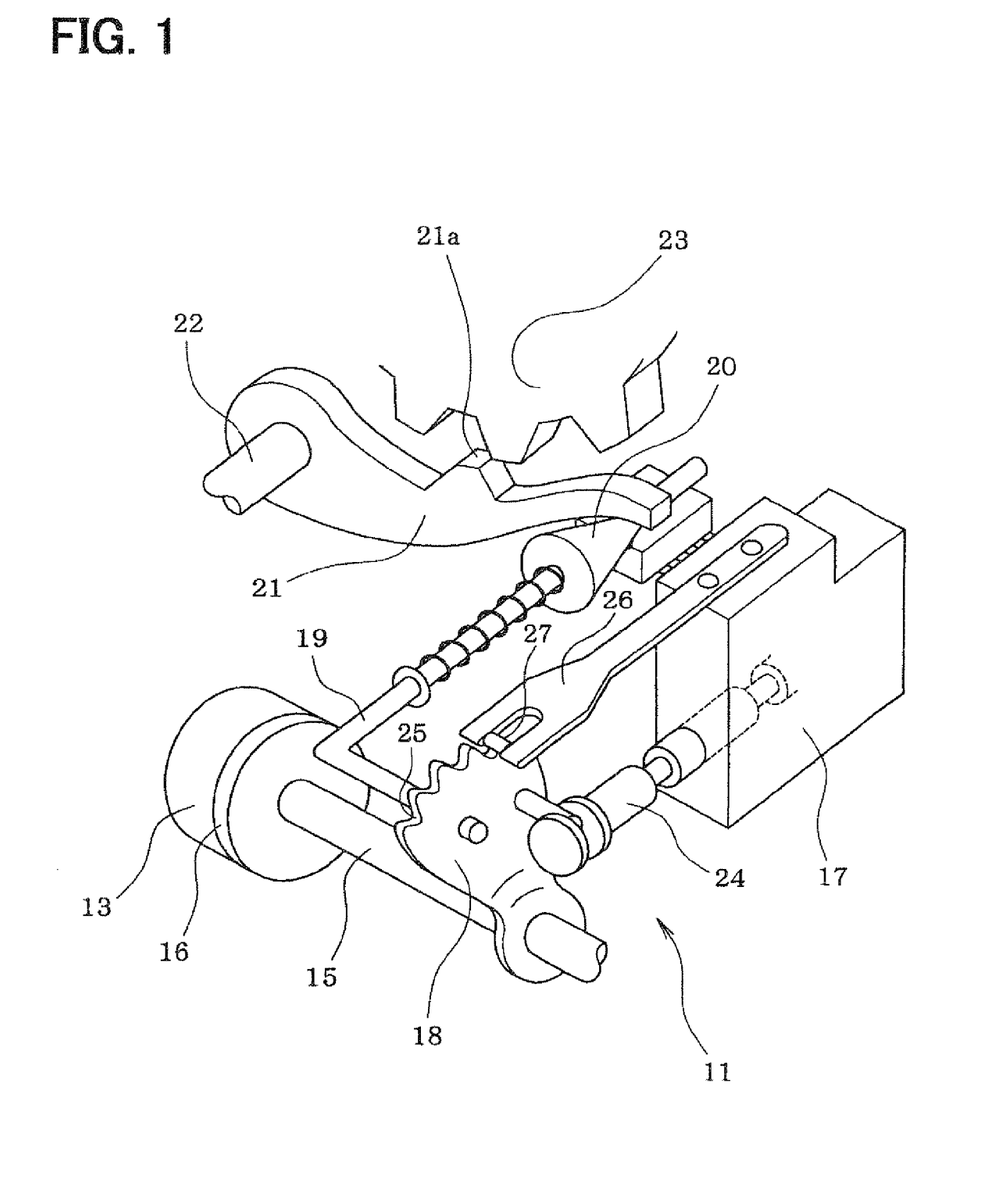
FIG. 1 is a schematic view showing a shift range changeover device of an automatic transmission, which is controlled by a control apparatus according to an embodiment of the present invention.
Figure 2:
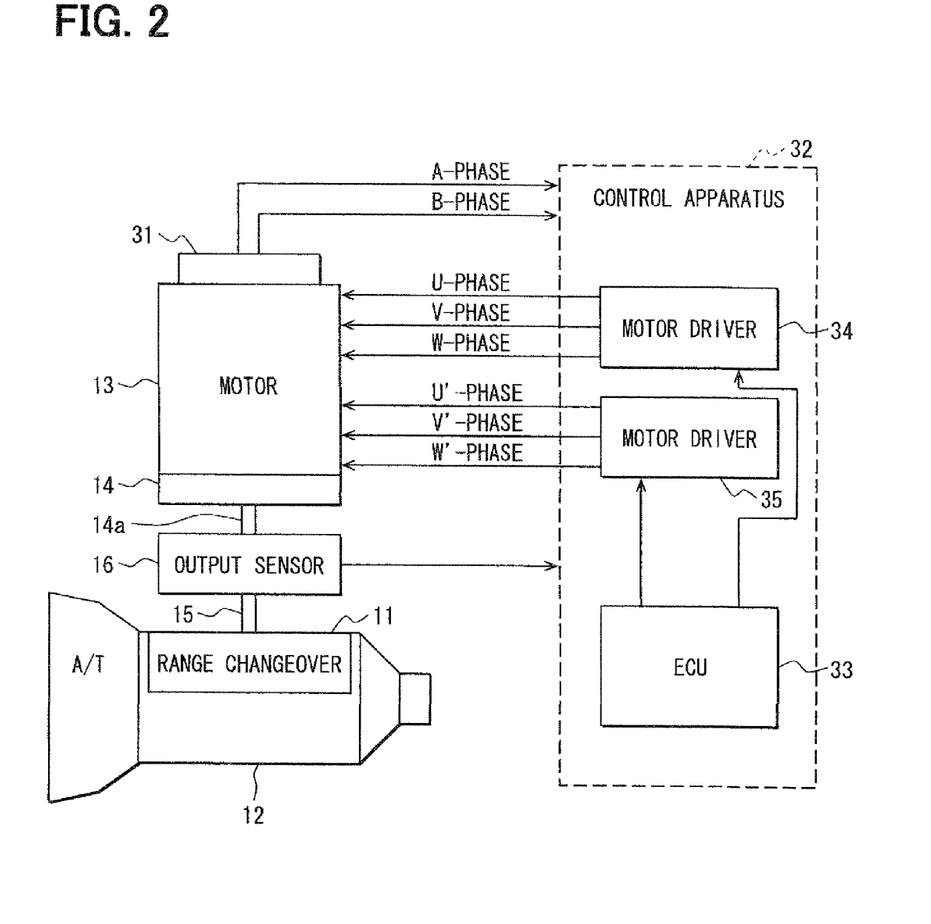
FIG. 2 is a block diagram showing the control apparatus for the shift range changeover device shown in FIG. 1.

Referring first to FIGS. 1 and 2, a shift range changeover device 11 is provided in an automatic transmission 12 of a vehicle. The changeover device 11 is for changing over a gear shift range of the automatic transmission 12 to, for example, a parking range (P), a reverse range (R), a neutral range (N) or a drive range (D). The range may be referred to as a gear shift position. An electric motor 13 that is a driving source of the range changeover device 11 is configured by, for example, a synchronous motor such as a switched reluctance motor (SR motor), and has a reduction mechanism 14 incorporated therein. An output shaft sensor 16 that detects the rotation position of an output shaft 14a of the reduction mechanism 14 is disposed at the rotational shaft of the reduction mechanism 14.

A manually-operable shaft (manual shaft) 15 of the range changeover device 11 is coupled to the output shaft 14a of the reduction mechanism 14 through a coupling section with play (not shown). A detent lever 18 is fixed to the manual shaft 15 for changing over a manual valve 17 of a hydraulic circuit of the automatic transmission 12. The detent lever 18 is fixed with an L-shaped parking rod 19, and a conical body 20 that is disposed at the leading section of the parking rod 19 is abutted against a lock lever 21.

The lock lever 21 is so designed as to vertically move while being centered on a shaft 22 according to the position of the conical body 20 to lock or unlock a parking gear 23. The parking gear 23 is disposed on an output shaft of the automatic transmission 12. When the parking gear 23 is locked by the lock lever 21, the driving wheels of the vehicle are held in a stop state (parking state).

Also, the detent lever 18 is coupled with a spool valve 24 of the manual valve 17. The detent lever 18 is rotated integrally with the output shaft 14a by the aid of the motor 13 to change the operation amount of the manual valve (position of the spool valve 24) so that the shift range of the automatic transmission 12 is changed over to any state of the P-range, the R-range, the N-range, and the D-range. The detent lever 18 is formed with four retentive recesses 25 for retaining the spool valve 24 at positions corresponding to the respective shift ranges.

A detent spring 26 for retaining the detent lever 18 at positions corresponding to the respective shift ranges is fixed to the manual valve 17. A roller (engagement section) 27 that is disposed on a leading end of the detent spring 26 is fitted into the retentive recesses 25 of a target shift range of the detent lever 18. As a result, the detent lever 18 is retained at the rotation position corresponding to the target shift range, and the position of the spool valve 24 of the manual valve 17 is retained at the position of the target shift range.

In the P-range, the parking rod 19 is moved in a direction of approaching the lock lever 21. A thicker portion of the conical body 20 pushes up the lock lever 21, a convex part (projection) 21a of the lock lever 21 is fitted into the parking gear 23 to lock the parking gear 23. With the above operation, the output shaft (driving wheels) of the automatic transmission 12 is held in the locked state (parking state).

In the shift ranges other than the P-range, the parking rod 19 moves away from the lock lever 21, the thicker portion of the conical body 20 exits from the lock lever 21, and the lock lever 21 moves down. With this operation, the convex part 21a of the lock lever 21 is disengaged from the parking gear 20 to cancel the lock of the parking gear 23, and the output shaft of the automatic transmission 12 is held in a rotatable state to allow travel of the vehicle.

The output shaft sensor 16 is a rotation position sensor (for example, potentiometer), which produces an output voltage varying linearly in accordance with the rotation positions of the output shaft 14a of the reduction mechanism 14 of the motor 13. The rotation position of the output shaft 14a varies with the rotation of the motor 13. The output voltage indicates the present rotation position of the output shaft 14a and hence the present shift range, which is either one of P, R, N and D-ranges. The output shaft sensor 16 is provided in a pair for failsafe purpose. Normally an output voltage of either one of the pair (two sensors) is used. If one of them fails, an output voltage of normal one of the pair is used.

As shown in FIG. 2, the motor 13 is equipped with an encoder 31 for detecting the rotation position of a rotor (motor). The encoder 31 is configured by, for example, a magnetic rotary encoder. The encoder 31 is so designed as to output pulse signals of an A-phase and a B-phase to a shift range changeover control apparatus 32 in synchronism with the rotation of the rotor of the motor 13. An electronic control unit (ECU) 33 of the shift range changeover control apparatus 32 counts both of the leading edge and the trailing edge of the A-phase signal and the B-phase signal which are output from the encoder 31. The ECU 33 then changes over the energization phase of the motor 13 in a given order by means of motor driver circuits 34 and 35 according to the encoder count value, to thereby rotationally drive the motor 13.

The ECU 33 determines the rotating direction of the rotor according to the occurrence order of the A-phase signal and the B-phase signal. In the positive of forward rotating direction (the rotating direction from the P-range to the D-range), the encoder count value is counted up. In the negative or reverse rotating direction (the rotating direction from the D-range to the P-range), the encoder count value is counted down. With this count operation, even if the motor 13 rotates in any direction of the positive rotation (forward rotation) or the negative rotation (reverse rotation), a correspondence relationship between the encoder count value and the rotation position of the motor 13 is maintained.

By changing over the energization phases in accordance with the detected motor rotation position (encoder count value), the ECU 33 performs feedback (F/B) control so that the motor 13 is driven to a target motor rotation position (target position) corresponding to a target shift range selected by the vehicle driver. In this control, the target motor rotation position corresponding to the target shift range may be corrected in accordance with a difference between the output shaft rotation position detected by the output shaft sensor 16 and the target output shaft rotation position corresponding to the target shift range.

The ECU 33 further has an abnormality monitoring function for monitoring presence or absence of abnormality (failure) in the output shaft sensor 16 and the encoder 31. This abnormality monitoring function monitors the following items (1) to (3).
(1) Relation between the motor rotation position detected by the encoder 31 (encoder count value) and the output shaft rotation position detected by the output shaft sensor 16 during the feedback control.
(2) Time interval between output pulse signals produced by the encoder 31 (or the rotor rotation speed).
(3) Relation of output signals (detection outputs) of the encoder 31 and the output shaft sensor 16 to a predetermined normal voltage range.

Figure 4:
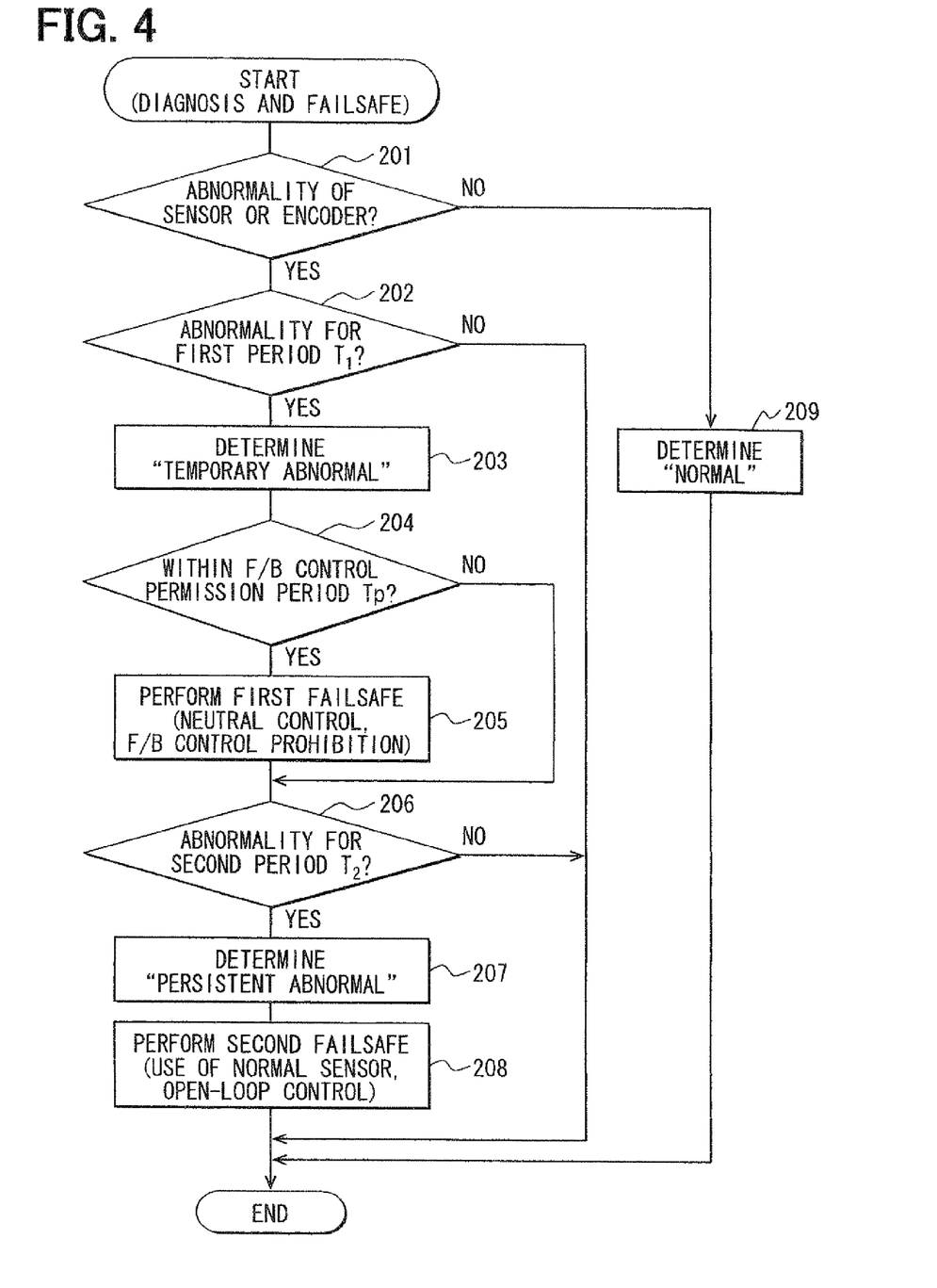
FIG. 4 is a flowchart showing a diagnosis and failsafe routine executed by the control apparatus shown in FIG. 4.

The ECU 33 also has a function of motor control by determining temporary abnormality and persistent abnormality by performing a diagnosis and failsafe routine shown in FIG. 4. Specifically, the ECU 33 is programmed to determine the possibility of abnormality (temporary abnormality) when the encoder 31 or the output shaft sensor 16 continues to produce abnormal detection outputs for more than a first predetermined abnormality determination period. The ECU 33 is programmed to finally determine abnormality (persistent abnormality) when the encoder 31 or the output shaft sensor 16 continues to produce the abnormal detection outputs for more than a second predetermined persistent abnormality period after the first predetermined period and to perform failsafe processing such as limp-home travel.

Figure 3:
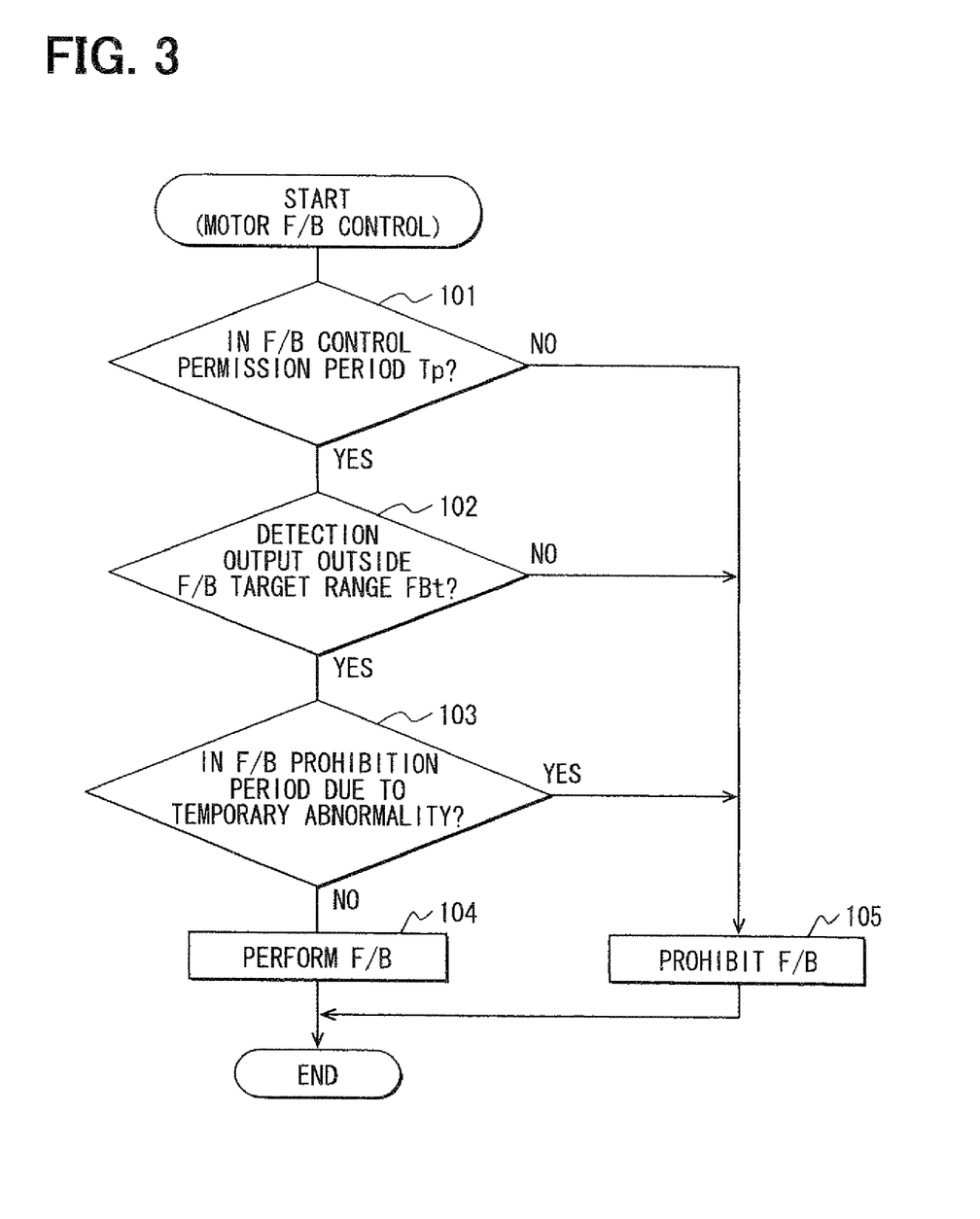
FIG. 3 is a flowchart showing a motor feedback control routine executed by the control apparatus shown in FIG. 2.

The ECU 33 has a further function of prohibiting feedback control for the motor 13 by performing motor feedback control shown in FIG. 3. In this control, the motor feedback control is prohibited after a predetermined feedback control permission period Tp from the changeover of the target shift range, which is effected by the vehicle driver by the range changeover operation (manipulation of the shift lever). Here, the feedback control permission period Tp is set to be longer than a motor drive period required to change over the actual (present) shift range to the target shift range.

In this case, if the temporary abnormality is determined within the feedback control permission period Tp after the changeover of the target shift range by the diagnosis and failsafe routine shown in FIG. 4, the ECU 33 prohibits the feedback control for the motor 13 and controls the shift range changeover device 11 to the N-range. If the temporary abnormality is determined within the period in which the feedback control for the motor 13 is prohibited, the ECU 33 continues to perform the same control as performed before the determination of the temporary abnormality.

If the persistent abnormality is determined, the ECU 33 uses the normal one of the pair of output shaft sensors 16 and open-loop controls the motor 13. As a result, the motor 13 is controlled to the rotation position, which is the target motor rotation position corresponding to the target shift range provided in the case of determination of the persistent abnormality, so that the shift range is changed over to the target shift range of the case of persistent abnormality.

In this open-loop control, the count value of the encoder 31 is not fed back, and the energization phases of the motor 13 are switched in sequence at predetermined time points. The number of this switching of the energization phases is counted. In accordance with the count value, the motor 13 is driven to the target motor rotation position corresponding to the target shift range provided for the case of determination of the persistent abnormality. Further, in accordance with the rotation position of the output shaft 14a detected by the output shaft sensor 16, the motor 13 is driven repeatedly by the open-loop control until it is confirmed that the shift range has been changed over to the target shift range provided for the case of persistent abnormality.

The failsafe processing for the case of persistent abnormality is not limited to the open-loop control, but may be other processing. For example, the encoder 31 may be provided in a pair, so that one of the pair is normally used to feedback-control the motor 13 and only the normal one of the pair is used to detect the motor rotation position and feedback control the motor 13.

The motor control (shift range changeover control) is performed by the ECU 33 based on the routines shown in FIGS. 3 and 4.

(Motor Feedback Control Routine)

The motor F/B control routine is repeated at a predetermined interval, while the ECU 33 is continuously supplied with electric power.

When execution of this routine is started, it is first checked at step 101 whether it is in the feedback control permission period Tp after the target shift range changeover. If it is not in the feedback control permission period Tp (NO at step 101), the feedback control for the motor 13 is prohibited to maintain the motor rotation position.

If it is in the feedback control permission period Tp after the target shift range changeover (YES at step 101), it is further checked at step 102 whether the detection output of the output shaft sensor 16 or the encoder 31 is outside a predetermined feedback target range FBt. If the detection output is not outside the feedback target range FBt (NO at step 102), that is, it is within the feedback target range FBt, the present shift range (actual shift range) is determined as being maintained at the target shift range. In this instance, the execution of the feedback control for the motor 13 is prohibited at step 105.

If the detection output of the output shaft sensor 16 or the encoder 31 is outside the feedback target range FBt (YES at step 102), it is checked at step 103 whether it is in the feedback prohibition period due to temporary abnormality, that is, whether the feedback control for the motor 13 has already been prohibited due to temporary determination of abnormality. If it is in the feedback prohibition period (YES at step 103), the feedback control is continued to be prohibited.

If it is not in the feedback prohibition period (NO at step 103), the feedback control for the motor 13 is performed at step 104. In this feedback control, the energization phase of the motor 13 is changed in sequence based on the motor rotation position detected by the encoder 31 (encoder output), so that the motor 13 is driven to the target motor rotation position corresponding to the target shift range and the shift range is actually changed over to the target shift range.

[Diagnosis and Failsafe Routine]

The diagnosis and failsafe routine is repeated at a predetermined interval, while the ECU 33 is continuously supplied with electric power.

When execution of this routine is started, it is checked at step 201 whether the output shaft sensor 16 or the encoder 31 is abnormal by referring to a determination result of an abnormality monitoring routine (not shown), which monitors presence or absence of abnormality in the output shaft sensor 16 and the encoder 31. If the output shaft sensor 16 and the encoder 31 are not abnormal (NO at step 201), both the output shaft sensor 16 and the encoder 31 are determined to be normal at step 209.

If the output shaft sensor 16 or the encoder 31 is abnormal (YES at step 201), it is further checked at step 202 whether the output shaft sensor 16 or the encoder 31 continues to be abnormal for a predetermined first period T1 (for example, 0.05 seconds) or more. If the continuation of the abnormality is less than the predetermined first period T1 (NO at step 202), this routine is ended.

If the continuation of the abnormality reaches the predetermined first period T1 or more (YES at step 202), the abnormality is determined to be a temporary at step 203. That is, it is temporarily or tentatively determined that the output shaft sensor 16 or the encoder 31 is abnormal. It is then checked at step 204 whether it is within the feedback control permission period Tp after the changeover of the target shift range. If it is in the feedback control permission period Tp (YES at step 204), first failsafe processing corresponding to the temporary abnormality is performed at step 205. In this first failsafe processing, the shift range changeover device 11 is driven to effect the N-range in the automatic transmission 12, that is, the neutral control is performed, and the feedback control for the motor 13 is prohibited.

If it is not in the feedback control permission period Tp (NO at step 204), failsafe processing at step 205 is not performed so that the same control is performed as before the determination of temporary abnormality.

After step 204 or 205, it is further checked at step 206 whether the output shaft sensor 16 or the encoder 31 still continues to be abnormal for a predetermined second period T2 (for example, 2.0 seconds) or more after the determination of temporary abnormality. If the continuation of the abnormality is less than the predetermined second period T2 (NO at step 206), this routine is ended.

If the continuation of the abnormality reaches the predetermined second period T2 or more (YES at step 206), the abnormality is determined to be persistently abnormal at step 207. That is, it is finally determined that the output shaft sensor 16 or the encoder 3L is in the persistent abnormality. Then at step 208, second failsafe processing corresponding to the persistent abnormality is performed. In this second failsafe processing, only one of the output shaft sensor pair, which is normal, is used and the open-loop control for the motor 13 is performed, so that the motor 13 is controlled to the target motor rotation position corresponding to the target shift range for the persistent abnormality case.

The second failsafe processing for the persistent abnormality is not limited to the open-loop control. It is alternatively possible to feedback-control the motor 13 to change over the shift range to the target shift range by detecting the actual motor rotation position. For this case, two encoders 31 (encoder pair) are provided, and only normal one of the encoder pair is used for the feedback control when the persistent abnormality of the other one of the encoder pair is determined.

The feedback control for the motor 13 is further described with reference to FIGS. 5A, 5B, 6A and 6B in comparison with the comparative example shown in FIGS. 7A and 7B.

Figure 5A:
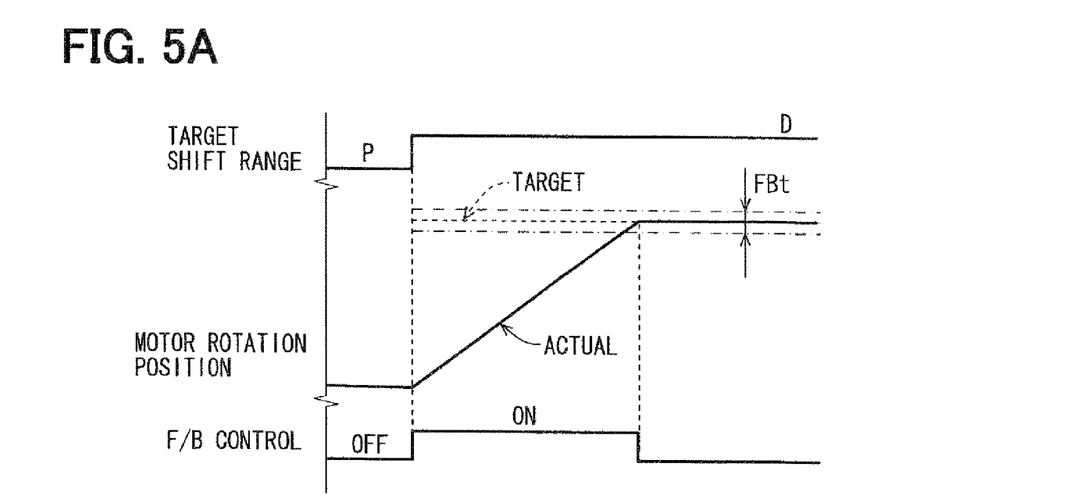
FIGS. 5A and 5B are time charts showing feedback control in a normal operation of the embodiment.
Figure 6A:
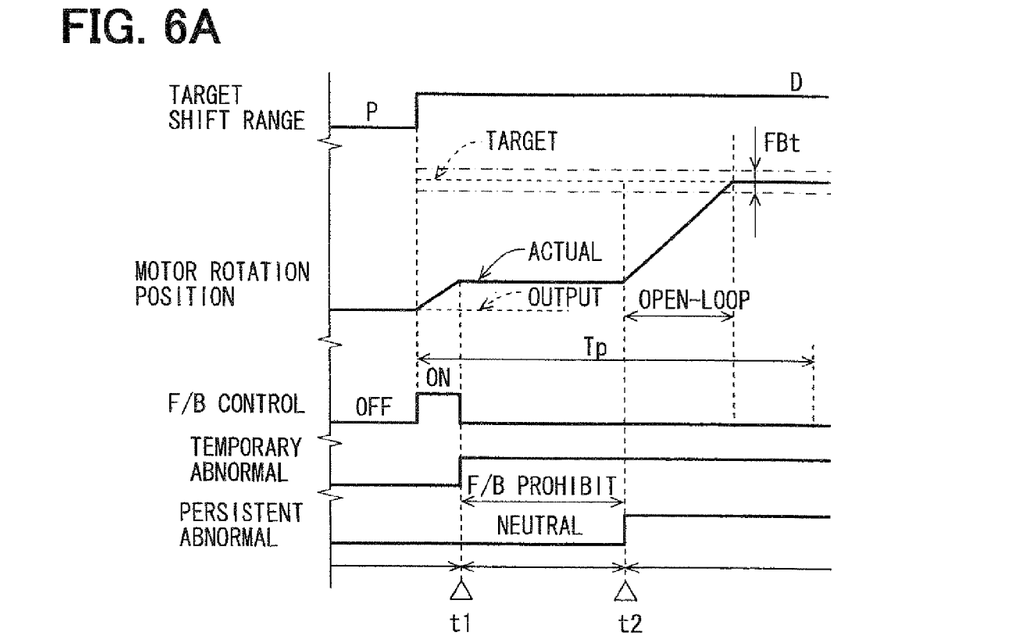
FIGS. 6A and 6B are time charts showing feedback control in an abnormal operation of the embodiment.

In the normal feedback control for the motor 13, as shown in FIG. 5A, when the target shift range is changed from the P-range to the D-range for example by manual manipulation on the shift lever of the automatic transmission 12, the feedback control for the motor 13 is started or turned on. In this feedback control, the energization phase of the motor 13 is switched in sequence in correspondence to the motor rotation position detected by the encoder 31 (encoder count) so that the motor 13 is driven to the target motor rotation position corresponding to the target shift range. When the motor rotation position (encoder count) detected by the encoder 31 or the output shaft rotation position detected by the output shaft sensor 16 reaches the rotation position corresponding to the target shift range, the feedback control for the motor 13 is stopped. As a result, the shift range is changed over to the target shift range and the motor rotation position is maintained within the feedback target range FBt, which is set to include the target motor rotation position therein.

Figure 5B:
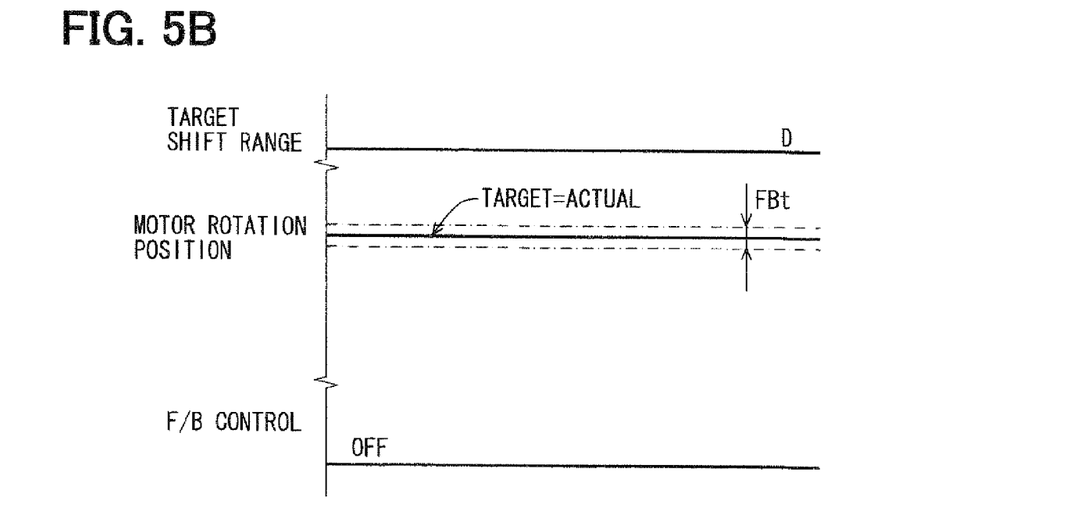

While the vehicle is traveling with the shift range being maintained at the D-range as shown in FIG. 5B, the detection outputs of the output shaft sensor 16 and the encoder 31 are maintained within the feedback target range FBt as long as the output shaft sensor 16 and the encoder 13 operate normally. As a result, the motor 13 is not feedback-controlled and is stopped from rotating.

Next, the control operation is described with reference to the case when the encoder 31 or the output shaft sensor 16 becomes abnormal.

As a comparative example, it is assumed to perform predetermined failsafe processing (open-loop control, etc.) only after abnormality continues for more than a predetermined period. Specifically, as shown in FIG. 7A, when the encoder 31 continues to output abnormal counts for the first predetermined period T1 after the changeover of the target shift range from the P-range to the D-range, the system is temporarily or tentatively determined to be abnormal at time t1. After time t1, the feedback control for the motor 13 is prohibited and the neutral control is effected to change over the shift range to the N-range contrary to the target D-range. When the encoder 31 further continues to produce abnormal counts for the second predetermined second period T2 after the time t1, the system is finally determined to be abnormal at time t2. With this final determination of abnormality, the predetermined failsafe processing is performed.

Figure 7A:
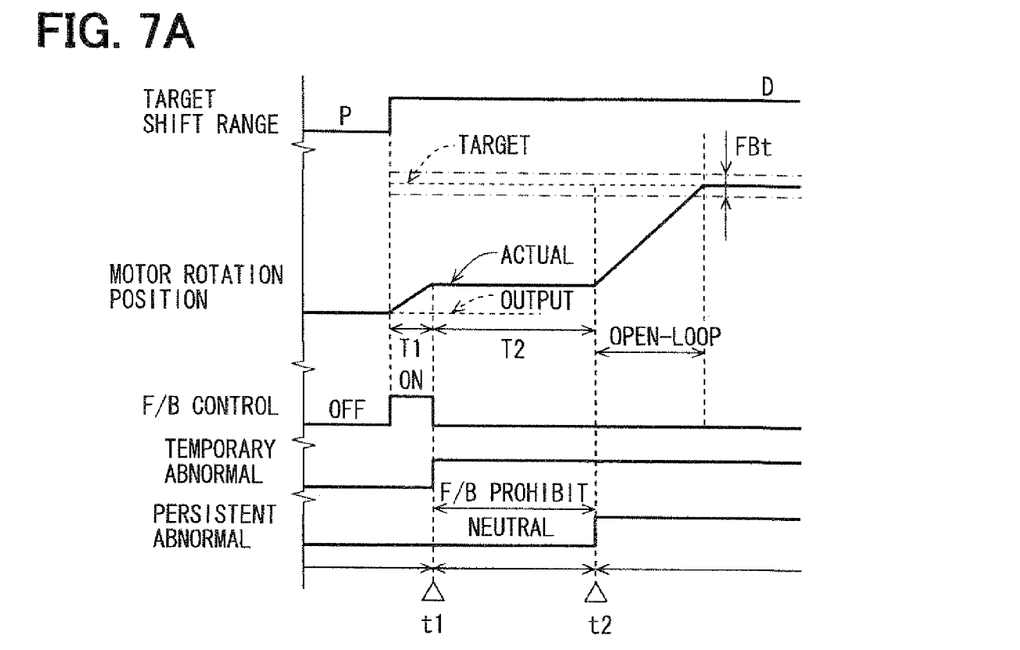
FIGS. 7A and 7B are time charts showing feedback control in an abnormal operation of a comparison embodiment.
Figure 7B:
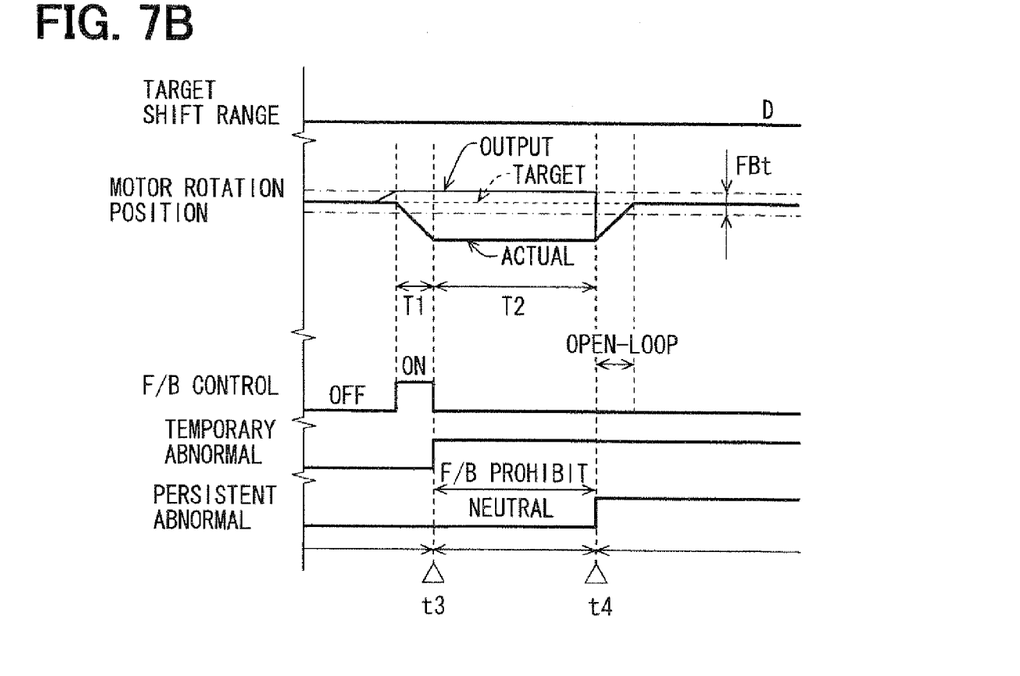

Further, as shown in FIG. 7B, when the output shaft sensor 16 or the encoder 31 becomes abnormal and its detection output deviates from the feedback target range FBt while the vehicle travels with the shift range being maintained at the D-range for example, the feedback control for the motor 13 is started or turned on. If the detection output of the output shaft sensor 16 or the encoder 31 continues to be abnormal (not within the feedback target range FBt) for the first predetermined period T1, the output sensor shaft 16 or the encoder 31 is temporarily determined to be abnormal (temporary abnormality) at time t3 and the first failsafe processing (neutral control and the feedback control prohibition) is performed. If this temporary abnormality continues for the second first predetermined period T2 after time t3, the output sensor 16 or the encoder 31 is finally determined to be abnormal (persistent abnormality) at time t4 and the second failsafe processing (open-loop control for the motor 13) is performed.

In this comparative example case, if the shift range changeover device 11 is controlled to effect the N-range of the automatic transmission 12 in the period between time t3 and time t4, while the vehicle is traveling with the target shift range being set to the D-range, the motive power of the engine cannot be transferred to the drive wheels of the vehicle because the transmission is changed to the N-range contrary to the target shift range, D-range.

According to the embodiment, therefore, the feedback control for the motor 13 is prohibited only after the predetermined feedback permission period Tp expires from the time the target shift range is changed over by the vehicle driver. Accordingly, as shown in FIG. 6A, when the temporary abnormality is determined within the feedback control permission period Tp following the changeover of the target shift range (for example, from the P-range to the D-range), the feedback control for the motor 13 is prohibited and the shift range changeover device 11 is controlled to effect the N-range in the same manner as in the comparative example shown in FIG. 7A. In this operation, the temporary abnormality indicates possibility of driving the motor 13 for shift ranges different from the target shift range (D-range). Therefore, by the feedback control prohibition and the neutral control, the shift range of the automatic transmission 12 is prevented from being erroneously controlled to different shift ranges, which may lead to travel of the vehicle in an improper shift range. In the case of FIG. 6A, the feedback control prohibition period corresponds to a period in which the persistent abnormality lasts, and the feedback control permission period Tp is about 1.0 second, although it is variable with changeover response speed.

Figure 6B:
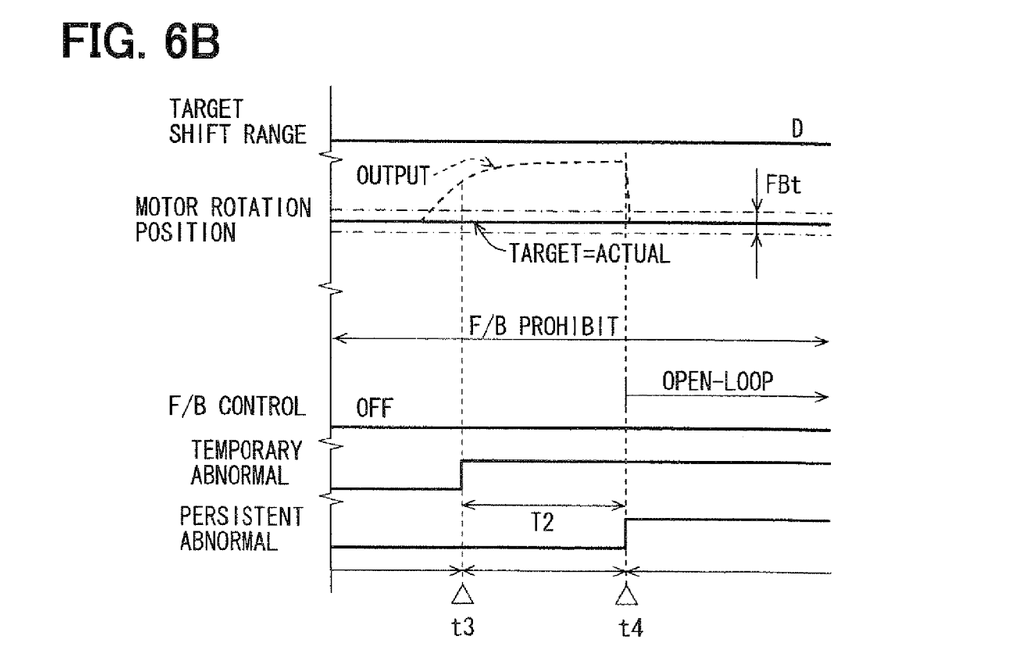

However, if the temporary abnormality is determined at time t3 as shown in FIG. 6B after the feedback control permission period Tp, the same control is continued as before the temporary abnormality is determined without performing the first failsafe processing (neutral control and the prohibition of the feedback control for the motor 13). For example, as shown in FIG. 6B, even if the temporary abnormality is determined at time t3 due to the failure in the output shaft sensor 16 or the encoder 31 while the vehicle is traveling with the shift range being maintained at the D-range as the target shift range, the feedback control permission period Tp has already elapsed. For this reason, the first failsafe processing for the temporary abnormality is not performed, and the same control is performed as before the determination of the temporary abnormality. If the abnormality of the output shaft sensor 16 or the encoder 31 further continues for the second predetermined period T2, the persistent abnormality is determined at time t4 and the second failsafe processing (open-loop control for the motor 13) is performed to counter the persistent abnormality. In the case of FIG. 6B, the feedback control prohibition period lasts persistently unless no range changeover is requested.

As described above, even if the detection output of the output shaft sensor 16 or the encoder 31 deviates from the feedback target range while the vehicle is traveling with the shift range being maintained at the same range, it is so assumed that the detection output has become abnormal for some reason and the shift range has not changed actually. Thus, even if the detection output of the output shaft sensor 16 or the encoder 31 becomes abnormal, this determination of the temporary abnormality may be ignored and the motor 13 need not be feedback-controlled to change over the shift range.

For this reason, according to the embodiment, the feedback control for the motor 13 is permitted until the feedback control permission period Tp elapses from the changeover of the target shift range, and the feedback control for the motor 13 is prohibited only after the elapse of the feedback control permission period Tp. The feedback permission period is set to be greater than the motor drive period required to change over the present shift range to the target shift range by the motor 13. Thus, after the feedback control period from the changeover of the shift range by the driver, the vehicle is assumed to be traveling with the shift range being unchanged. Even if the detection output of the output shaft sensor 16 or the encoder 31 deviates from the feedback control target range, such abnormality is assumed to have arisen by chance and ignored. Thus, the prohibition of the feedback control of the motor 13 is enabled.

It is thus prevented that the shift range of the automatic transmission 12 is erroneously changed over to a different shift range, which does not correspond to the shift range selected by the driver, even if the detection output of the output shaft sensor 16 or the encoder 31 becomes abnormal during the travel with the shift range being maintained as selected by the driver. As a result, the shift range of the automatic transmission 12 is not changed over to the N-range unnecessarily and hence transfer of the motive power of the engine to the drive wheels can be ensured.

In the embodiment, the shift range changeover device 11 may be configured to control the shift range to the second drive range (D2) or the low gear range (L) in addition to the above ranges P, A, N and D. Alternatively, the shift range changeover device 11 may be configured to control the shift range to only two ranges, that is, P-range and non-P-range.

Only the encoder 31 may be provided and the output shaft sensor 16 may be eliminated. The failsafe processing for the persistent abnormality may be varied in many other ways.

What is claimed is:

1. A control apparatus for a shift range changeover device, which includes a motor as a drive source and changes over a shift range of an automatic transmission, the control apparatus comprising:
    rotation position detection means configured to detect a rotation position of the motor or a rotation member rotated by the motor;
    feedback control means configured to perform feedback control for the motor for changing over the shift range from an actual shift range to a target shift range in accordance with a detection output indicating the rotation position detected by the rotation position detecting means;
    feedback control prohibition means configured to prohibit the feedback control for the motor after a predetermined feedback control permission period measured from changeover of the target shift range, wherein the feedback control permission period is set to be greater than a motor drive period required for the shift range changeover device to change over the shift range from the actual shift range to the target shift range;
    temporary abnormality control means configured to determine temporary abnormality, when the detection output of the rotation position detection means continues to be abnormal for a first abnormality determination period; and
    persistent abnormality control means configured to determine persistent abnormality and perform predetermined failsafe processing, when the detection output of the rotation position detection means continues to be abnormal for a second abnormality determination period following determination of the temporary abnormality,
    wherein the temporary abnormality control means is configured to prohibit the feedback control for the motor and control the shift range changeover device to effect a neutral range, when the temporary abnormality is determined within the feedback control permission period, and
    wherein the persistent abnormality control means is configured to continue same control as performed before the temporary abnormality is determined, when the temporary abnormality is determined in a period in which the feedback control for the motor is prohibited by the feedback control prohibition means.

2. The control apparatus according to claim 1, wherein:
    the feedback control prohibition means is configured to prohibit the feedback control for the motor after the predetermined feedback control permission period irrespective of whether the detection output of the rotation position detecting means indicates abnormality in a detected rotation position.

3. A method of controlling a shift range changeover device, which includes a motor as a drive source and changes over a shift range of an automatic transmission, the method comprising:
    detecting a rotation position of the motor or a rotation member rotated by the motor;
    performing feedback control for the motor for changing over the shift range from an actual shift range to a target shift range in accordance with a detection output indicating the detected rotation position;
    prohibiting the feedback control for the motor after a predetermined feedback control permission period measured from changeover of the target shift range, wherein the feedback control permission period is set to be greater than a motor drive period required for the shift range changeover device to change over the shift range from the actual shift range to the target shift range;
    determining a temporary abnormality, when the detection output indicating the detected rotation position continues to be abnormal for a first abnormality determination period;
    determining a persistent abnormality and performing predetermined failsafe processing, when the detection output indicating the detected rotation position continues to be abnormal for a second abnormality determination period following determination of the temporary abnormality;
    prohibiting the feedback control for the motor and control the shift range changeover device to effect a neutral range, when the temporary abnormality is determined within the feedback control permission period; and
    continuing same control as performed before the temporary abnormality is determined, when the temporary abnormality is determined in a period in which the feedback control for the motor is prohibited.

4. The method according to claim 3, wherein:
    the feedback control for the motor is prohibited after the predetermined feedback control permission period irrespective of whether the detection output indicating the detected rotation position indicates abnormality.

* * * * *